(12) United States Patent
Nakahashi et al.

(10) Patent No.: US 7,884,825 B2
(45) Date of Patent: Feb. 8, 2011

(54) DRAWING METHOD, IMAGE GENERATING DEVICE, AND ELECTRONIC INFORMATION APPARATUS

(75) Inventors: Teruyuki Nakahashi, Chita (JP); Tanio Nagasaki, Tokyo (JP); Minoru Takahata, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 540 days.

(21) Appl. No.: 11/813,753

(22) PCT Filed: Oct. 21, 2005

(86) PCT No.: PCT/JP2005/019387

§ 371 (c)(1),
(2), (4) Date: Feb. 18, 2008

(87) PCT Pub. No.: WO2006/008045

PCT Pub. Date: Aug. 3, 2006

(65) Prior Publication Data

US 2008/0198163 A1     Aug. 21, 2008

(30) Foreign Application Priority Data

Jan. 25, 2005   (JP) ............................. 2005-017059

(51) Int. Cl.
   *G06T 11/20*   (2006.01)
(52) U.S. Cl. ...................... 345/443; 345/611
(58) Field of Classification Search ................ None
   See application file for complete search history.

(56) References Cited

U.S. PATENT DOCUMENTS

| | | | |
|---|---|---|---|
| 6,057,855 A | 5/2000 | Barkans | |
| 7,587,685 B2 * | 9/2009 | Wallace | 715/854 |
| 2001/0048764 A1 * | 12/2001 | Betrisey et al. | 382/162 |
| 2002/0000988 A1 * | 1/2002 | Nelson et al. | 345/443 |
| 2003/0187952 A1 * | 10/2003 | Young et al. | 709/219 |

FOREIGN PATENT DOCUMENTS

| | | |
|---|---|---|
| JP | 03-092899 | 4/1991 |
| JP | 04-139589 | 5/1992 |
| JP | 07-121731 | 5/1995 |
| JP | 08-022548 | 1/1996 |
| JP | 11-086007 | 3/1999 |

OTHER PUBLICATIONS

Japanese Patent Office, Notifcation of Reason(s) for Refusal, issued in corresponding Japanese Application No. 2005-017059, Nov. 11, 2008, 3 pages and 3-page English language translation.

Japanese Patent Office, "Decision of Refusal," issued in corresponding Japanese Application No. 2005-017059, Feb. 24, 2009, 3 pages and 3-page English language translation.

(Continued)

*Primary Examiner* — Andrew Wang
*Assistant Examiner* — David H Chu
(74) *Attorney, Agent, or Firm* — Fitch, Even, Tabin & Flannery

(57) ABSTRACT

An edge function is computed from two vertex coordinates given by a rendering target line. Gradient determination is then performed on the edge function, and the functions representing two shift lines that are formed by translating the rendering target line in the y-axis direction or x-axis direction depending on the angle formed by the rendering target line and the x-axis of the rendering plane coordinate system by 0.5d and −0.5d will be computed, where d denotes the width of one pixel. Then, the number of subpixels included in a parallelogram, which has four points of the starting points and ending points of the two shift lines as vertices, is acquired so as to determine the pixel value of each pixel based on the number.

16 Claims, 12 Drawing Sheets

OTHER PUBLICATIONS

Chengyu Sun et al.; "Hardware Acceleration for Spatial Selections and Joins;" UCSB Technical Report; 2002; 12 pages.

Patent Cooperation Treaty; "International Search Report;" for corresponding PCT International Application No. PCT/JP2005/019387; Nov. 22, 2005; 4 pages.

Patent Cooperation Treaty; "Written Opinion of the International Searching Authority;" for corresponding PCT International Application No. PCT/JP2005/019387; Nov. 22, 2005; 8 pages.

Patent Cooperation Treaty; "International Preliminary Report on Patentability;" for corresponding PCT International Application No. PCT/JP2005/019387; Nov. 30, 2006; 11 pages.

\* cited by examiner

66

DRAWING METHOD, IMAGE GENERATING DEVICE, AND ELECTRONIC INFORMATION APPARATUS

TECHNICAL FIELD

The present invention relates to a rendering method, an image generating apparatus and an electronic information device for generating rendering data on a pixel-by-pixel basis.

BACKGROUND ART

Significant advances of recent years in computer graphics and image processing technologies, used in the field of computer games or digital broadcasting, have enabled more exquisite displaying of three-dimensional (3D) images or other objects on the screen. Polygons representing objects in 3D space or two-dimensional (2D) images input by users are sent to a display apparatus or the like as pixel-based digital image information.

When representing, on a pixel-by-pixel basis, images that originally have been analog information, or line segments connecting vertices with known coordinates, the method therefor is selected in accordance with desired processing speed or rendering accuracy, or ease of the hardware implementation.

Pixels are arranged discretely. Therefore, when converting a graphic to be rendered into pixel-based data, a case may occur in which the graphic appears with jagged edges, called jaggies, due to the contour of the constituent pixels of the graphic appearing on the image, or with thin lines fragmented. These phenomena are generally called aliasing, and anti-aliasing methods, such as rendering at a higher resolution, have been devised to reduce such phenomena (see Non-Patent Document 1, for example).

[Non-Patent Document 1] Chengyu Sun et. al., "Hardware Acceleration for Spatial Selections and Joins," UCSB Technical Report (2002-17).

DISCLOSURE OF INVENTION

Problems to be Solved by the Invention

The inventors have recognized that, although aliasing can be reduced by performing anti-aliasing, there may occur another problem in that the overall impression of a graphic, including width of lines, differs from the intended result. The inventors have also recognized that raising resolution may increase the computational load due to the anti-aliasing process itself and consequently may pose a barrier to high-speed rendering.

The present invention has been made in view of such problems, and a purpose thereof is to provide a technique for generating rendering information that includes a desired rendering geometry with less effect of aliasing. Another purpose of the present invention is to provide an anti-aliasing technique advantageous in terms of computational load and processing speed.

Means for Solving the Problems

One aspect of the present invention relates to a rendering method. In the rendering method, an area is specified as a rendering area of a line to be rendered in such a manner as to contain the line to be rendered in the center and have a width which is an integral multiple of the size of a pixel in either the horizontal or vertical direction of a display screen, and the pixel value of a pixel is determined in accordance with the proportion of the display area of the pixel included in the rendering area.

The "display area of a pixel" means an area in each square in which the color or density of a pixel defined by a pixel value can be displayed, when a digitalized image is represented on a pixel-by-pixel basis. The area of such display area varies according to the resolution of the display apparatus, etc.

Another aspect of the present invention also relates to a rendering method. In the rendering method, an area is specified as a rendering area of a line to be rendered in such a manner as to contain the line to be rendered, two parallel lines as boundaries obtained by shifting the line to be rendered by a predetermined width in either the horizontal or vertical direction of a display screen, and the endpoints of the two parallel lines as vertices, and the pixel value of a pixel is determined in accordance with the proportion of the display area of the pixel included in the rendering area.

Yet another aspect of the present invention also relates to a rendering method. The rendering method comprises: specifying, as a rendering area of a line to be rendered, an area which contains the line to be rendered, two parallel lines as boundaries obtained by shifting the line to be rendered by a predetermined width in either the horizontal or vertical direction of a display screen, and the endpoints of the two parallel lines as vertices; specifying a scan area of rectangle shape, which contains the rendering area and includes at least a part of the boundaries of the rendering area in the boundaries thereof; scanning the scan area on a subpixel-by-subpixel basis, in which the subpixels are obtained by virtually dividing the display area of a pixel into a predetermined number, and acquiring the number of subpixels included in the rendering area; and determining the pixel value of the pixel in accordance with the proportion of the number of subpixels included in the rendering area among subpixels included in each pixel.

Still yet another aspect of the present invention relates to an image generating apparatus. The image generating apparatus comprises: a rendering information acquisition unit which reads information on an image to be rendered; a rendering data generating unit which generates rendering data represented on a pixel-by-pixel basis by each pixel value based upon the information on the image; and a rendering data storage unit which stores the rendering data, wherein, in representing, on a pixel-by-pixel basis, a line to be rendered included in the information on the image, the rendering data generating unit specifies, as a rendering area of the line to be rendered, an area which contains the line to be rendered in the center and has a width which is an integral multiple of the size of a pixel in either the horizontal or vertical direction of a display screen, and the unit determines the pixel value of a pixel in accordance with the proportion of the display area of the pixel included in the rendering area.

As a factor for determining a pixel value in the rendering data generating unit, an attribute added in a typical rendering process, such as shadow or texture, may be appropriately included.

A further aspect of the present invention also relates to an image generating apparatus. The image generating apparatus comprises: a rendering information acquisition unit which reads information on an image to be rendered; a rendering data generating unit which generates rendering data represented on a pixel-by-pixel basis by each pixel value based upon the information on the image; and a rendering data storage unit which stores the rendering data, wherein, in representing, on a pixel-by-pixel basis, a line to be rendered included in the information on the image, the rendering data generating unit specifies, as a rendering area of the line to be rendered, an area which contains the line to be rendered, two parallel lines as boundaries obtained by shifting the line to be rendered by a predetermined width in either the horizontal or vertical direction of a display screen, and the endpoints of the two parallel lines as vertices, and the unit determines the pixel value of a pixel in accordance with the proportion of the display area of the pixel included in the rendering area.

Optional combinations of the aforementioned constituting elements, and implementations of the invention in the form of methods, apparatuses, systems and computer programs may also be practiced as additional modes of the present invention.

ADVANTAGES

The present invention enables rendering of lines having less effect of aliasing while retaining desired geometries.

Figure 1:
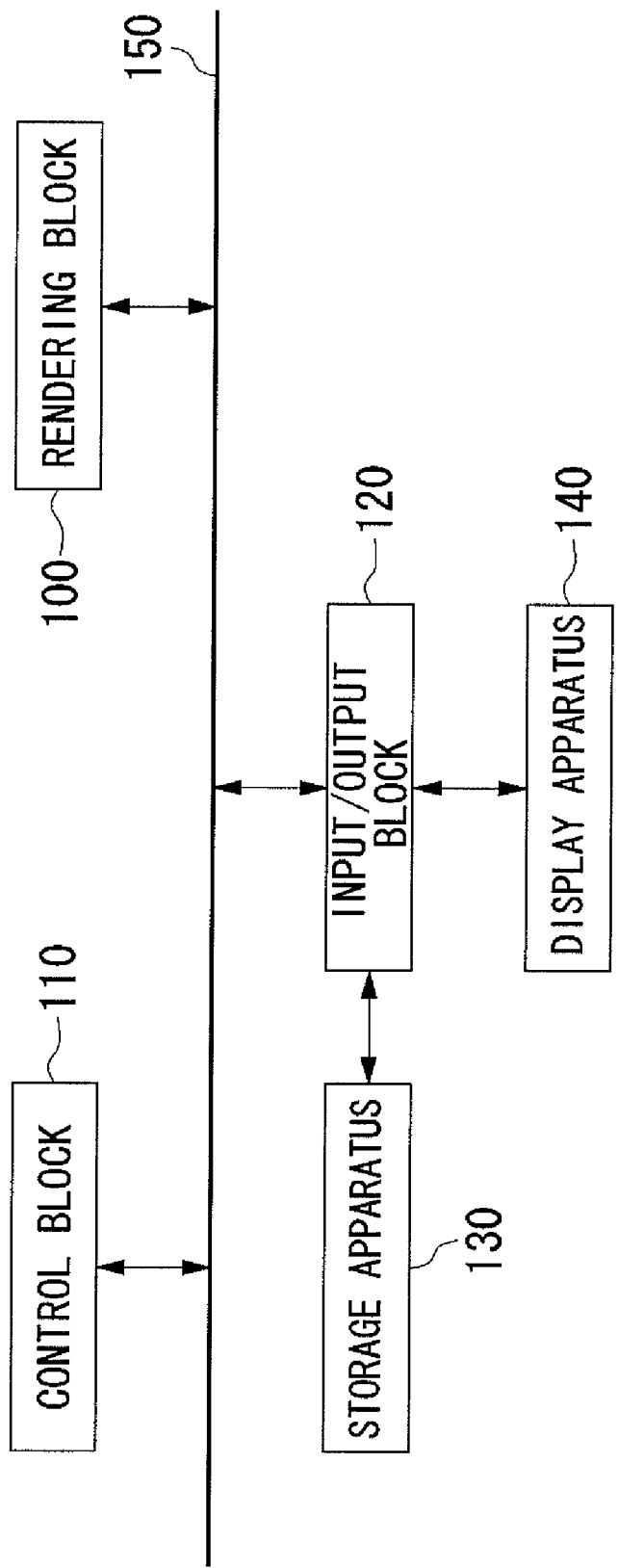
FIG. 1 is a configuration diagram of an image generating apparatus of the present embodiment.

EXPLANATION OF REFERENCE NUMERALS 10 rasterizer
12 vertex data reading unit
14 view transformation unit
16 setup processing unit
18 pixel information generating unit
19 pixel information transmitting unit
20 rendering computation unit
66 rendering target line
68 shift line
100 rendering block
120 input/output block
200 image generating apparatus

BEST MODE FOR CARRYING OUT THE INVENTION

FIG. 1 is a configuration diagram of an image generating apparatus 200 according to the present embodiment. The image generating apparatus 200 consists of a rendering block 100, a control block 110 and an input/output block 120, which are connected to each other via a bus 150. To the input/output block 120 are also connected a storage apparatus 130 and a display apparatus 140. The input/output block 120 may communicate with another apparatus via a network, so as to import data necessary for rendering from an external source. It will be obvious to those skilled in the art that the functional blocks shown in FIG. 1, etc. may be implemented in a variety of forms by hardware only, software only or a combination thereof, and the form is not limited to any of them.

The control block 110 is a block that controls the entirety of the image generating apparatus 200. The block manages synchronization of data transfer between the interior of the image generating apparatus 200 and peripheral apparatuses such as the storage apparatus 130 and the display apparatus 140. The control block 110 is also responsible for processing interrupts from the individual units in the image generating apparatus 200, and management of a timer.

The input/output block 120 reads 3D model information or various parameters stored in the storage apparatus 130 and provides the read data to the rendering block 100. The input/output block 120 may receive data necessary for rendering from an external apparatus via a network and provide such data to the rendering block 100. The input/output block 120 displays rendering data output by the rendering block 100 on the display apparatus 140.

The rendering block 100 performs a rendering process for generating rendering data based on 3D model information provided by the input/output block 120 and subsequently writing the generated data in a frame buffer.

Figure 2:
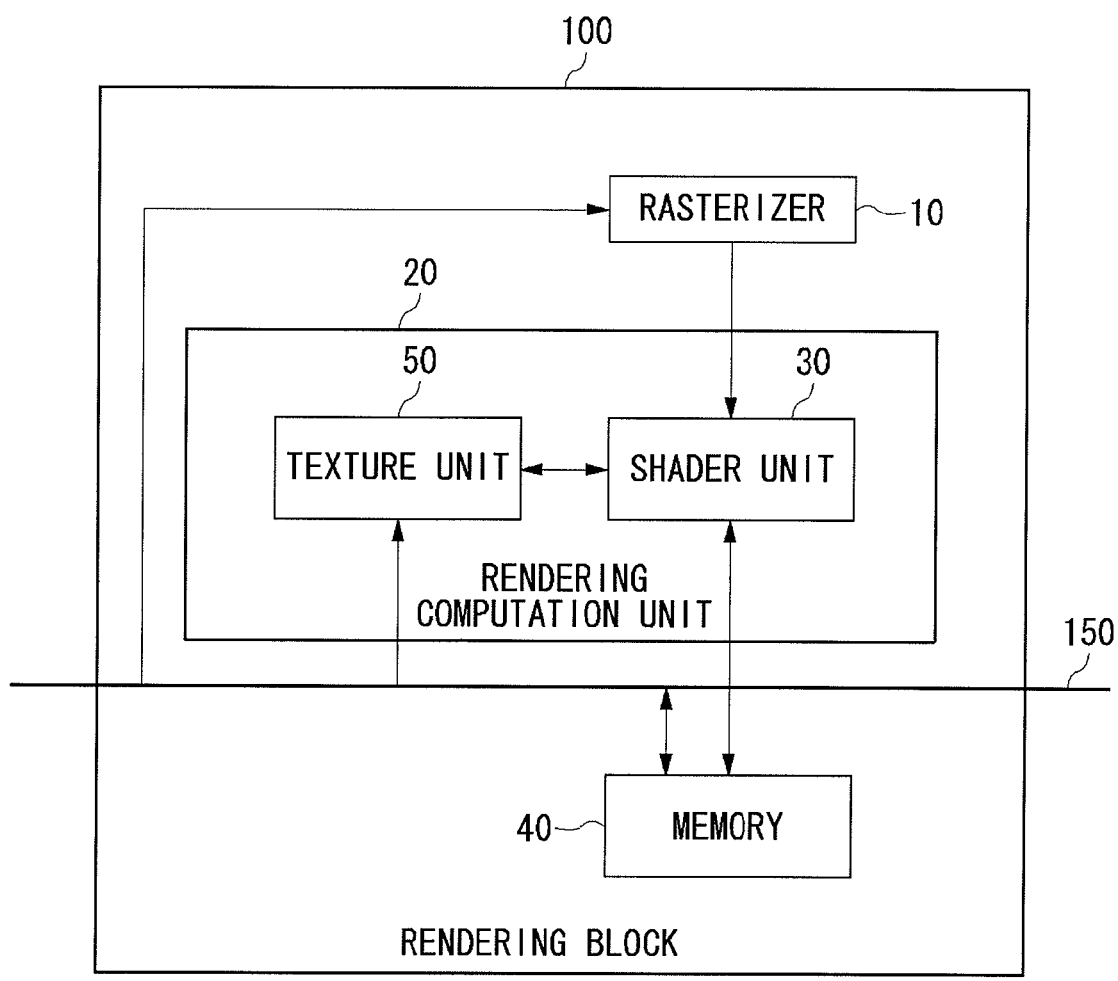
FIG. 2 is a configuration diagram of a rendering block of the present embodiment.

FIG. 2 is a configuration diagram of the rendering block 100. A rasterizer 10 receives vertex data of rendering primitives from the input/output block 120. A rendering primitive is generally a triangle, and the rasterizer 10 performs view transformation of a triangle in 3D space into a triangle on a rendering plane using projective transformation. Further, the rasterizer 10 performs rasterization by which the triangle on the rendering plane is scanned along the horizontal direction and transformed, row by row, into quantized pixels. The rasterizer 10 develops the rendering primitive into pixels and computes pixel information including RGB color values, an α value and a Z value for each pixel.

The rasterizer 10 generates a pixel area of a predetermined size along the scan line (hereinafter, referred to as "rendering target area") and provides the generated area to a rendering computation unit 20 in the subsequent stage. The rendering computation unit 20 includes a shader unit 30 and a texture unit 50, and processing therein is performed using a memory 40. The memory 40 is provided with a frame buffer and a texture buffer. The frame buffer and the texture buffer may be provided in a single memory, or in memories physically separated.

The rendering target areas supplied from the rasterizer 10 to the rendering computation unit 20 are stuck in a queue. The shader unit 30 then sequentially processes the rendering target areas stuck in the queue.

The shader unit 30 performs shading processing based on pixel information computed by the rasterizer 10, determines pixel colors after texture mapping based on texel information obtained by the texture unit 50, and writes rendering data in the frame buffer in the memory 40. The shader unit 30 further performs processing like fogging or alpha blending on the rendering data held in the frame buffer to determine rendering colors ultimately to be reproduced, and updates the rendering data in the frame buffer accordingly. The rendering data stored in the frame buffer is read out by the input/output block 120 and output to the display apparatus 140.

The texture unit 50 receives inputs of parameters designating texture data from the shader unit 30, computes addresses of the texture data, and requests the texture buffer in the memory 40 to provide necessary texture data. The texture unit 50 then caches the texture data read from the texture buffer, performs a filtering process such as bilinear interpolation or trilinear interpolation, and outputs the resultant data to the shader unit 30.

Figure 3:
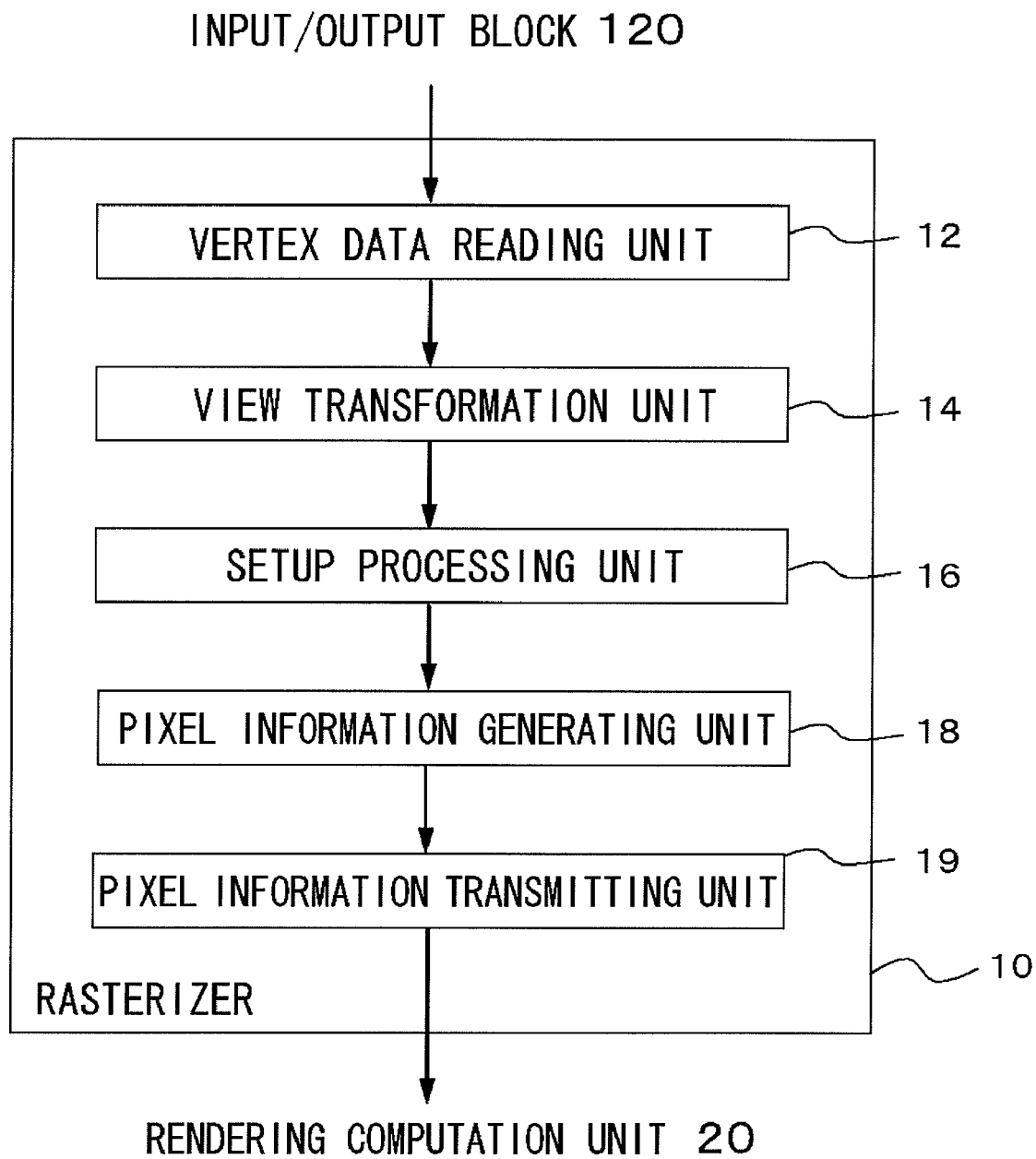
FIG. 3 is a configuration diagram of a rasterizer of the present embodiment.

FIG. 3 is a configuration diagram of the rasterizer 10. The rasterizer 10 comprises: a vertex data reading unit 12 which receives vertex data of rendering primitives from the input/output block 120; a view transformation unit 14 which transforms vertex data of rendering primitives into vertex data in the rendering plane coordinate system using view transformation; a setup processing unit 16 which computes a function representing a line segment connecting vertex coordinates on a rendering plane (hereinafter, referred to as "edge function") or determines a scan area used in DDA processing in the subsequent stage; a pixel information generating unit 18 which scans a rendering geometry such as a triangle, for which edge functions have been acquired, in the horizontal direction on the rendering plane and performs DDA (Digital Differential Analyzer) processing or the like on the geometry row by row so as to acquire pixel information, including RGB color values, an $\alpha$ value and a Z value, for each pixel inside the rendering geometry or on the sides thereof; and a pixel information transmitting unit 19 which provides to the rendering computation unit 20 a rendering target area including pixel information acquired by the pixel information generating unit 18.

Figure 4:
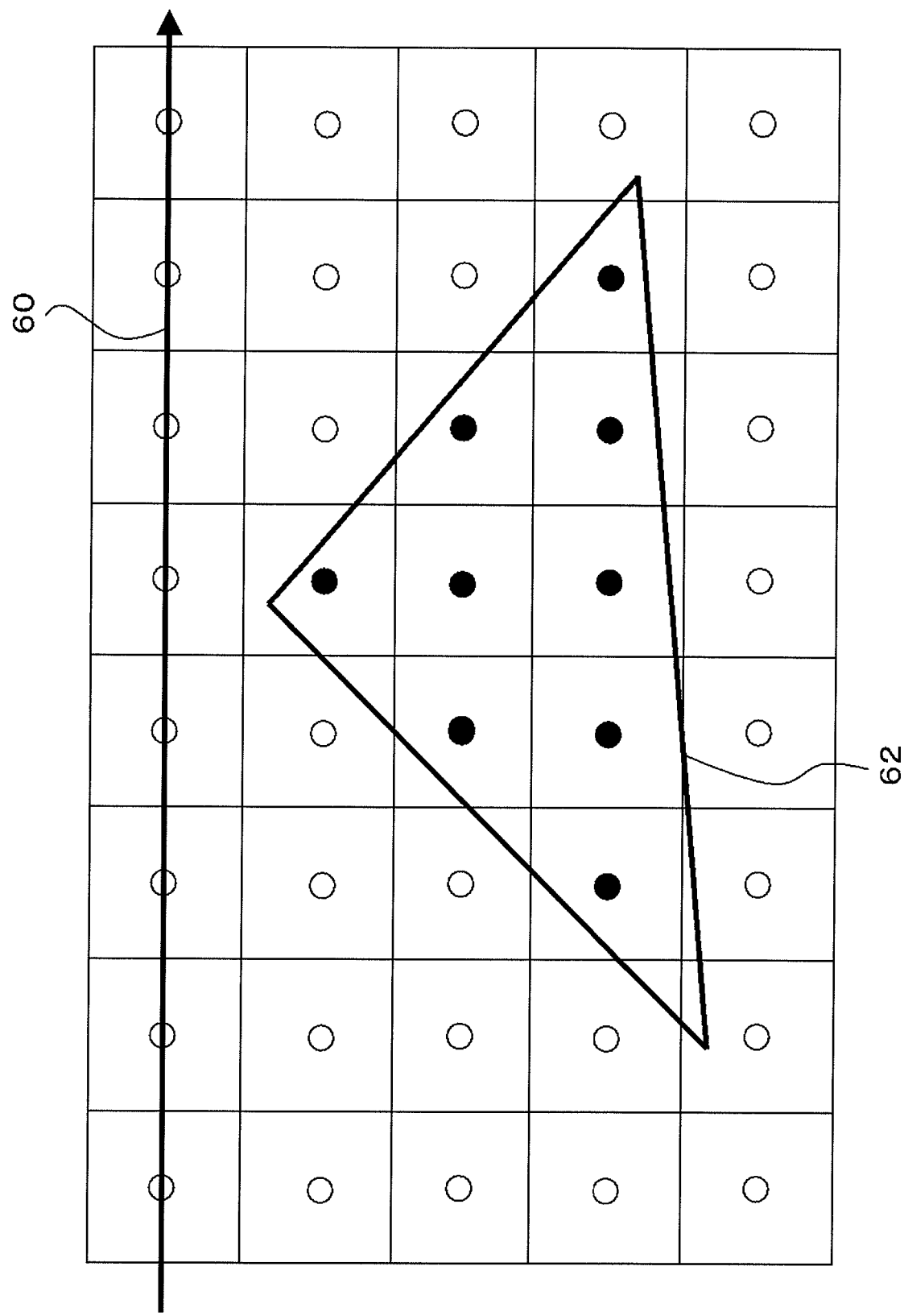
FIG. 4 is a diagram for describing a method for generating pixel information on a pixel-by-pixel basis in rendering a triangle.
Figure 5:
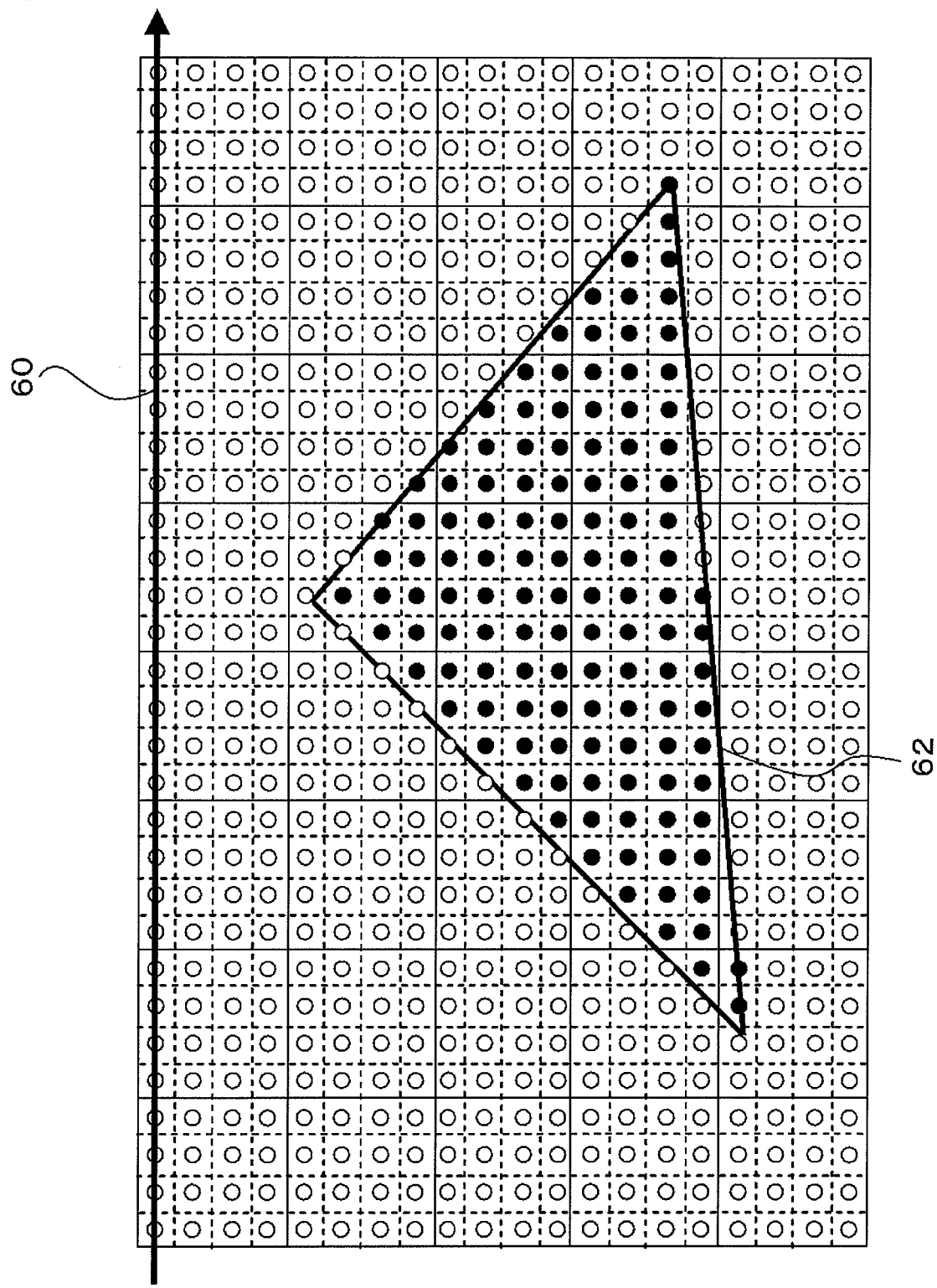
FIG. 5 is a diagram for describing a method for generating pixel information on a subpixel-by-subpixel basis in rendering a triangle.

The operation in the pixel information generating unit 18 of the rasterizer 10 will now be described. The overall operation will be described first to explain the present embodiment. FIGS. 4 and 5 illustrate processing in the pixel information generating unit 18 performed on a triangle in the rendering plane coordinate system, for which the vertex data and edge functions have been acquired. FIG. 4 shows pixel-based processing, and FIG. 5 shows subpixel-based processing in which each pixel is virtually divided into subpixels. In these figures, a display area of one pixel is indicated with a square of solid lines, and a display area of one subpixel with a square of dotted lines.

In the pixel-based processing shown in FIG. 4, a triangle 62 is scanned sequentially row by row, for example in a horizontal scanning direction 60 and downward from the top row, so as to conduct inside/outside determination for determining whether or not each pixel is inside the triangle 62. In FIG. 4, a pixel determined as being inside the triangle 62 is indicated with a filled circle, and a pixel determined as being outside the triangle 62 with an open circle. FIGS. 5 through 7 and FIG. 8 will also use the same indication. After the inside/outside determination, linear interpolation is performed on pixels inside the triangle 62, row by row with the sides of the triangle 62 as endpoints, so as to compute RGB color values and a Z value for each pixel. Since all the processing is performed on a discrete pixel-by-pixel basis in the pixel-based processing as shown in FIG. 4, the difference between pixels inside and outside the triangle 62 becomes significant, causing aliasing including jaggies more visible.

FIG. 5 shows a case where each pixel is virtually divided into four in longitudinal and lateral directions respectively, so that one pixel is divided into 16 subpixels. In this case, scanning is performed sequentially row by row on a subpixel-by-subpixel basis in the scanning direction 60, so as to conduct inside/outside determination of subpixels with respect to the triangle 62. Then, the number of subpixels in a pixel that appear inside the triangle 62 is counted in order to compute a ratio of such number to the total number of subpixels in a pixel, i.e. 16, as an $\alpha$ value for each pixel. For example, when three subpixels are inside the triangle 62 among the constituent subpixels of a pixel, the $\alpha$ value of the pixel is $3/16$.

The $\alpha$ value is used in alpha blending performed by the shader unit 30 in a subsequent stage. For example, when, in a display area of a pixel extending both inside and outside the triangle 62, A is a pixel value for the inside of the triangle 62 and B is a pixel value for the outside, the pixel value of the pixel is provided as "$\alpha A+(1-\alpha)B$" so that the two pixel values A and B are divided internally in a ratio of $(1-\alpha):\alpha$ for blending. Since such blending adjusts the pixel value of each pixel according to the positional relationship between the pixel and the triangle 62, the difference between such pixel and a pixel outside the triangle 62 is reduced, resulting in aliasing effect less than that in the case of FIG. 4 where the concept of subpixels is not employed. The rasterizer 10 may generate both information resulting from pixel-based scanning and information resulting from subpixel-based scanning, as described with reference to FIGS. 4 and 5, and thereafter the shader unit 30 may determine whether to perform alpha blending in accordance with the display content or the state of the apparatus.

Figure 6:
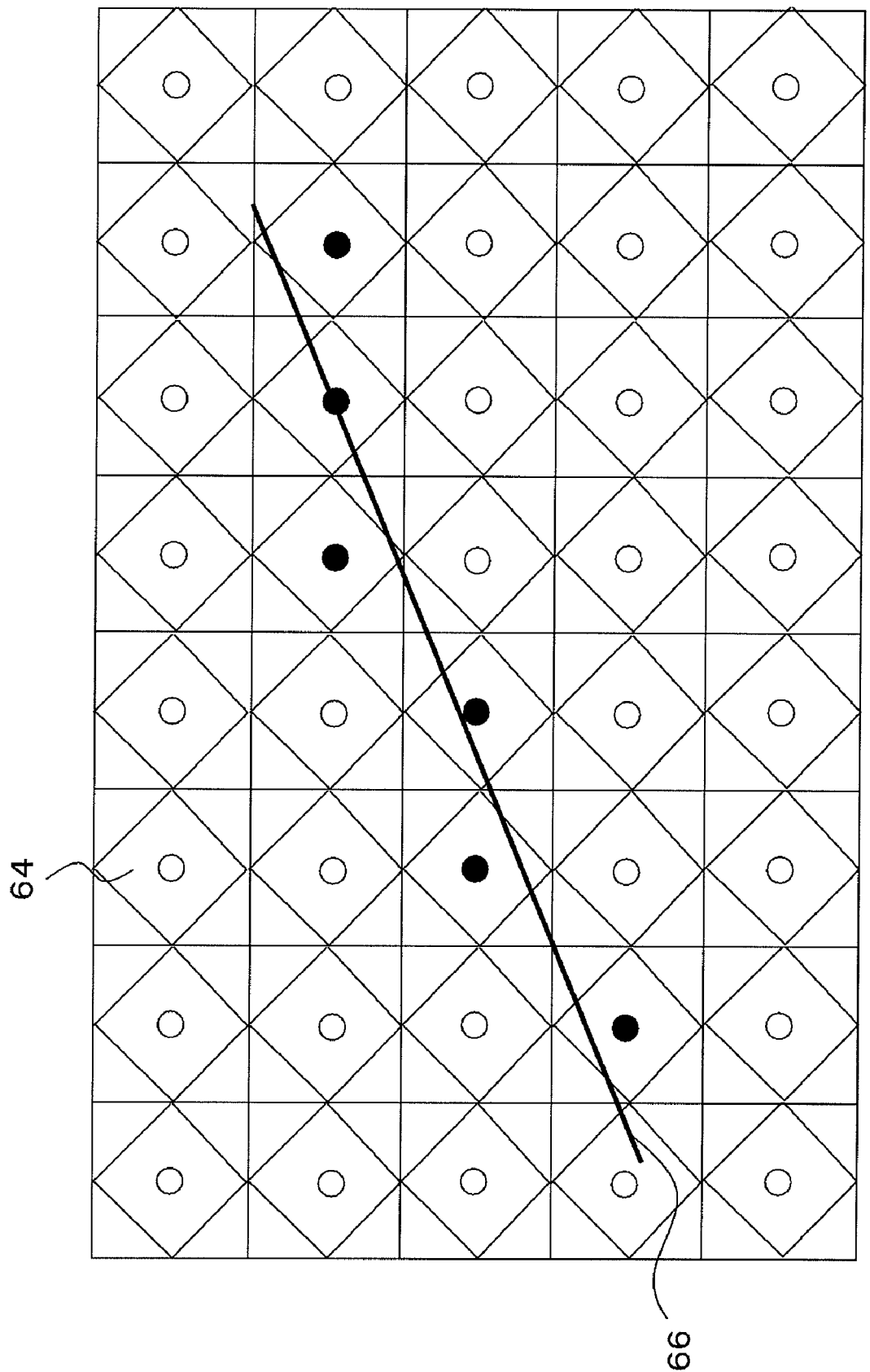
FIG. 6 is a diagram for describing the diamond rule used in rendering a line.

An illustrative method for generating pixel information of a line segment in the rendering plane coordinate system for which the vertex data and edge function have been acquired (hereinafter, referred to as "rendering target line") will be described next with reference to FIG. 6. FIG. 6 is a diagram for describing the diamond rule (Diamond-Exit Rule), which is a method used to generate pixel information of a rendering target line. In the diamond rule are virtually created diamond-shape quadrangles, each of which has the center of a pixel as center point and the midpoints of the sides of the pixel as vertices (hereinafter, simply referred to as "diamond 64"). The determination for the pixels constituting a rendering target line 66 is then performed according to whether the rendering target line 66 traverses each of the diamonds 64. As FIG. 6 shows, since pixels determined as constituting the rendering target line 66 are discrete, the difference between such pixels and other pixels becomes significant, causing aliasing including jaggies more visible, in a similar manner as described with reference to FIG. 4 for the case of triangle.

Figure 7:
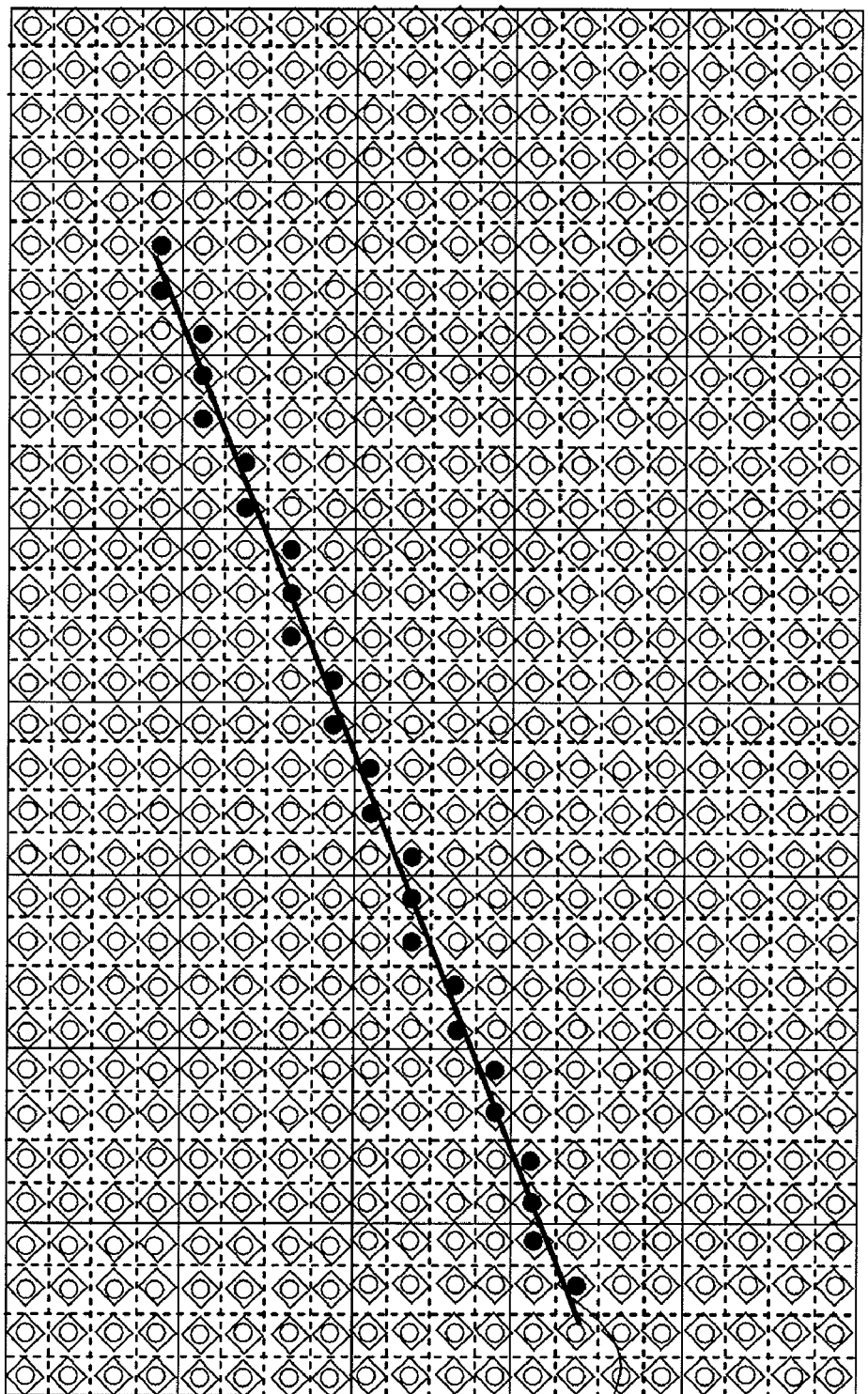
FIG. 7 is a diagram for describing the diamond rule applied on a subpixel-by-subpixel basis in rendering a line.

A case will be considered here in which the subpixel-based scanning function, employed in the case of triangle as described above, is used to reduce aliasing in a rendering line. FIG. 7 illustrates a mode in which the subpixel-based scanning method is employed in rendering a line using the diamond rule. FIG. 7 also shows an example in which each pixel is divided into four in longitudinal and lateral directions respectively, so that one pixel is divided into 16 subpixels. When the diamond rule described above is applied to each of the subpixels, subpixels that contain diamonds traversed by the rendering target line 66 are determined as constituting the line, and the rest of the subpixels are considered as having no relation to the rendering target line 66.

When considering that one pixel in the pixel-based diamond rule shown in FIG. 6 consists of 16 subpixels, a pixel determined as constituting the rendering target line 66 is considered as containing 16 subpixels all of which are determined as constituting the rendering target line 66. In the subpixel-based processing shown in FIG. 7, in comparison, the number of subpixels determined as constituting the rendering target line 66 among subpixels included in one pixel is extremely small, and hence, the $\alpha$ value computed as pixel-based information is also small in general. Therefore, when compared to the case of pixel-based processing shown in FIG. 6, the line rendered based on the rendering data resulting from alpha blending in the shader unit 30 may look thinner, lighter in color, or discontinuous. Thus, the inventors have recognized that, if alpha blending is performed in such condition by the shader unit 30 in order to reduce aliasing, there may often occur a problem in that the impression of the rendered line itself varies.

In the following, there will be explained the operation performed in the setup processing unit 16 and the pixel information generating unit 18 in the rasterizer 10 of the present embodiment provided to overcome the above problem.

Figure 8:
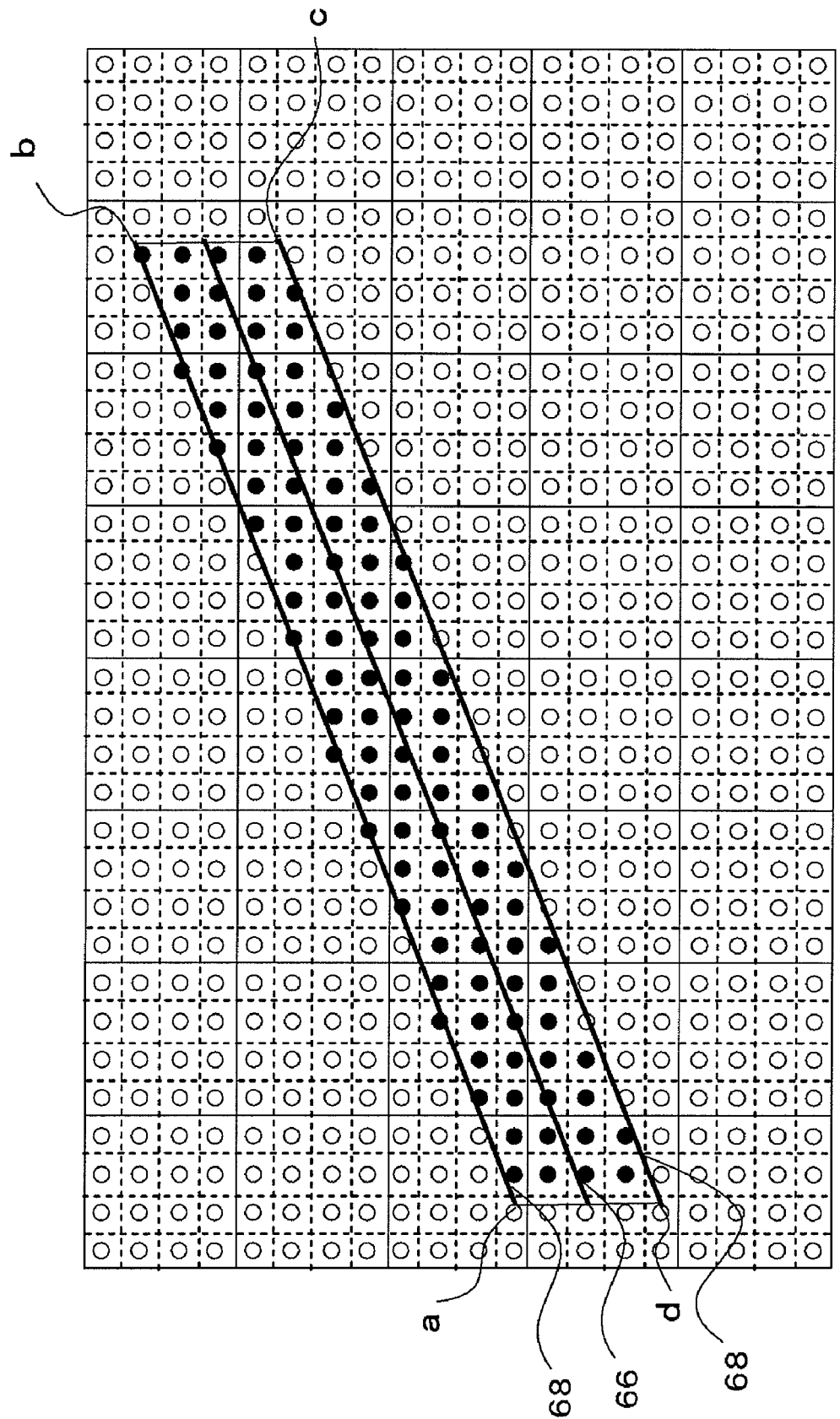
FIG. 8 is a diagram for describing a method for generating pixel information in rendering a line in the present embodiment.

FIG. 8 illustrates processing in the pixel information generating unit 18 of the present embodiment performed on a line in the rendering plane coordinate system, for which the vertex data and edge function have been acquired. FIG. 8 shows an example in which each pixel is divided into four in longitudinal and lateral directions respectively, so that one pixel is divided into 16 subpixels. The number of subpixels, however, is not limited thereto and may be set in accordance with the desired cost or accuracy of computation; the method of the present embodiment is applicable to any cases. As illustrated in FIG. 8, the line is considered as an area having a given width in the present embodiment, and inside/outside determination of subpixels is performed with respect to the area. Specifically, the area is a parallelogram abcd formed by two shift lines 68 that are created by translating, in the axial direction of the rendering plane coordinate system, the rendering target line 66 for which the edge function has been computed, and two lines parallel to the shifting direction (hereinafter, referred to as "end sides").

Figure 9:
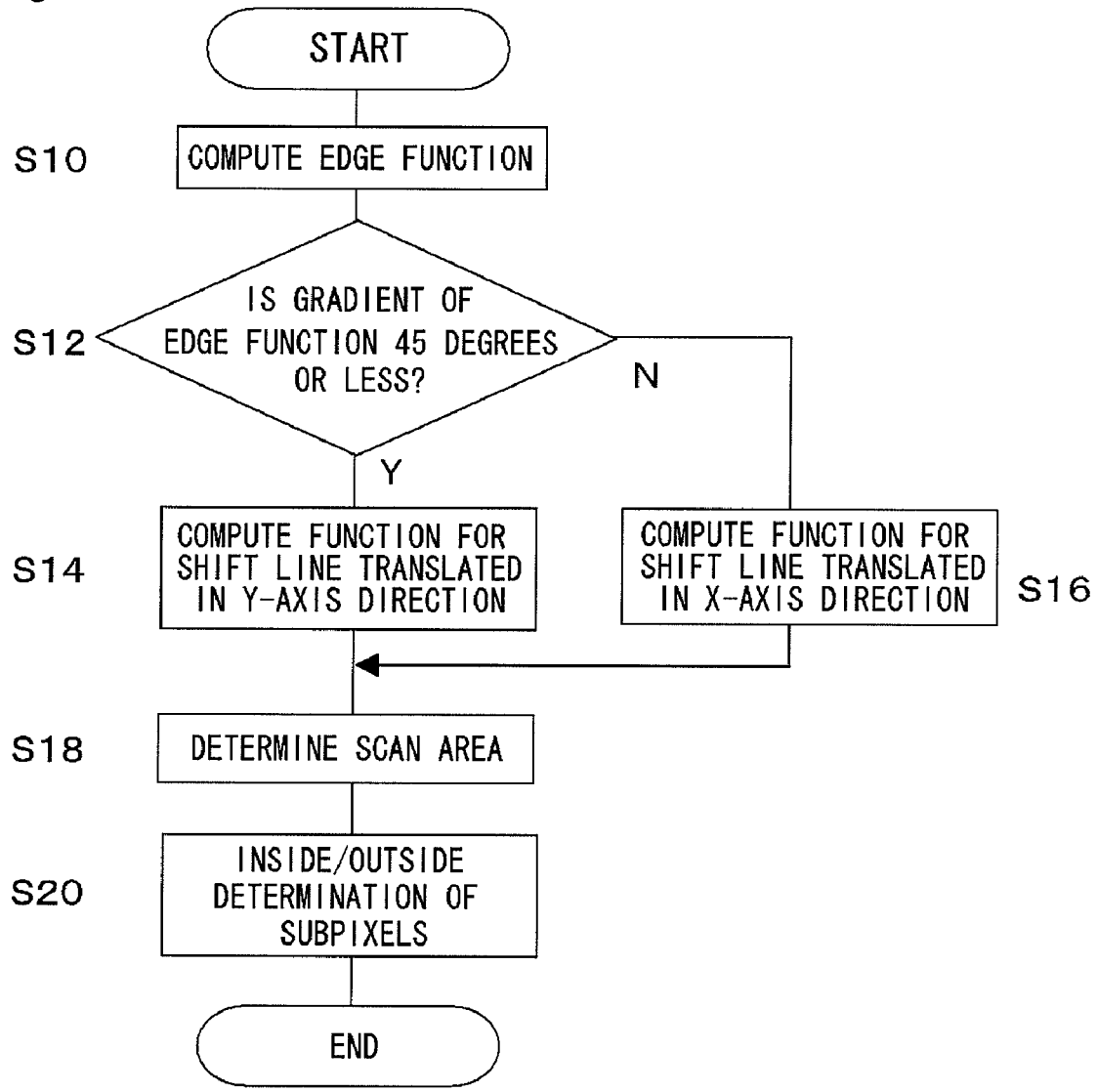
FIG. 9 is a flowchart which shows a procedure for generating pixel information in rendering a line in the present embodiment.

FIG. 9 is a flowchart which shows the procedure of the operation performed in the setup processing unit 16 and the pixel information generating unit 18 of the present embodiment. First, the edge function is computed from the two vertex coordinates given by the rendering target line 66 (S10). Gradient determination is then performed on the edge function, and if the acute angle formed by the rendering target line 66 and the x-axis of the rendering plane coordinate system is 45 degrees or less (Y at S12), the functions representing two shift lines 68 that are formed by translating the rendering target line 66 in the y-axis direction by 0.5d and −0.5d will be computed (S14). Here, d denotes the width of a display area of one pixel. FIG. 8 shows a case where the acute angle formed by the rendering target line 66 and the x-axis is 45 degrees or less, so that the rendering target line 66 is translated in the y-axis direction. If, on the other hand, the acute angle formed by the rendering target line 66 and the x-axis of the rendering plane coordinate system is more than 45 degrees (N at S12), the functions representing two shift lines 68 that are formed by translating the rendering target line 66 in the x-axis direction by 0.5d and −0.5d will be computed (S16).

Hereinafter, in cases where the acute angle formed by the rendering target line 66 and the x-axis of the rendering plane coordinate system is 45 degrees or less (Y at S12), the x-axis will be called the major axis with respect to the rendering target line 66, while the y-axis will be called the minor axis. On the other hand, in cases where the acute angle formed by the rendering target line 66 and the x-axis of the rendering plane coordinate system is more than 45 degrees (N at S12), the x-axis will be the minor axis while the y-axis will be the major axis.

A scan area is determined next to detect subpixels included in a parallelogram abcd, which has four points of the starting points and ending points of the two shift lines 68 as vertices (S18). The inside/outside determination of subpixels is then performed by scanning the scan area (S20). The scanning method therefor will be described later.

Thereafter, as with the case of the aforementioned triangle processing employing the concept of subpixels, a ratio of the number of subpixels in a pixel that appear inside the parallelogram abcd to the total number of subpixels in a pixel is computed as an α value for each pixel. By using this α value in alpha blending performed by the shader unit 30, line rendering can be performed such that the line has a width of about d, i.e. one pixel, a shade similar to that of a line rendered based on pixel information generated by the diamond rule or the like without subpixels employed, and less effect of aliasing.

Next, there will be described a method of subpixel-based scanning in the present embodiment performed in S18 and S20 shown in FIG. 9.

Figure 10:
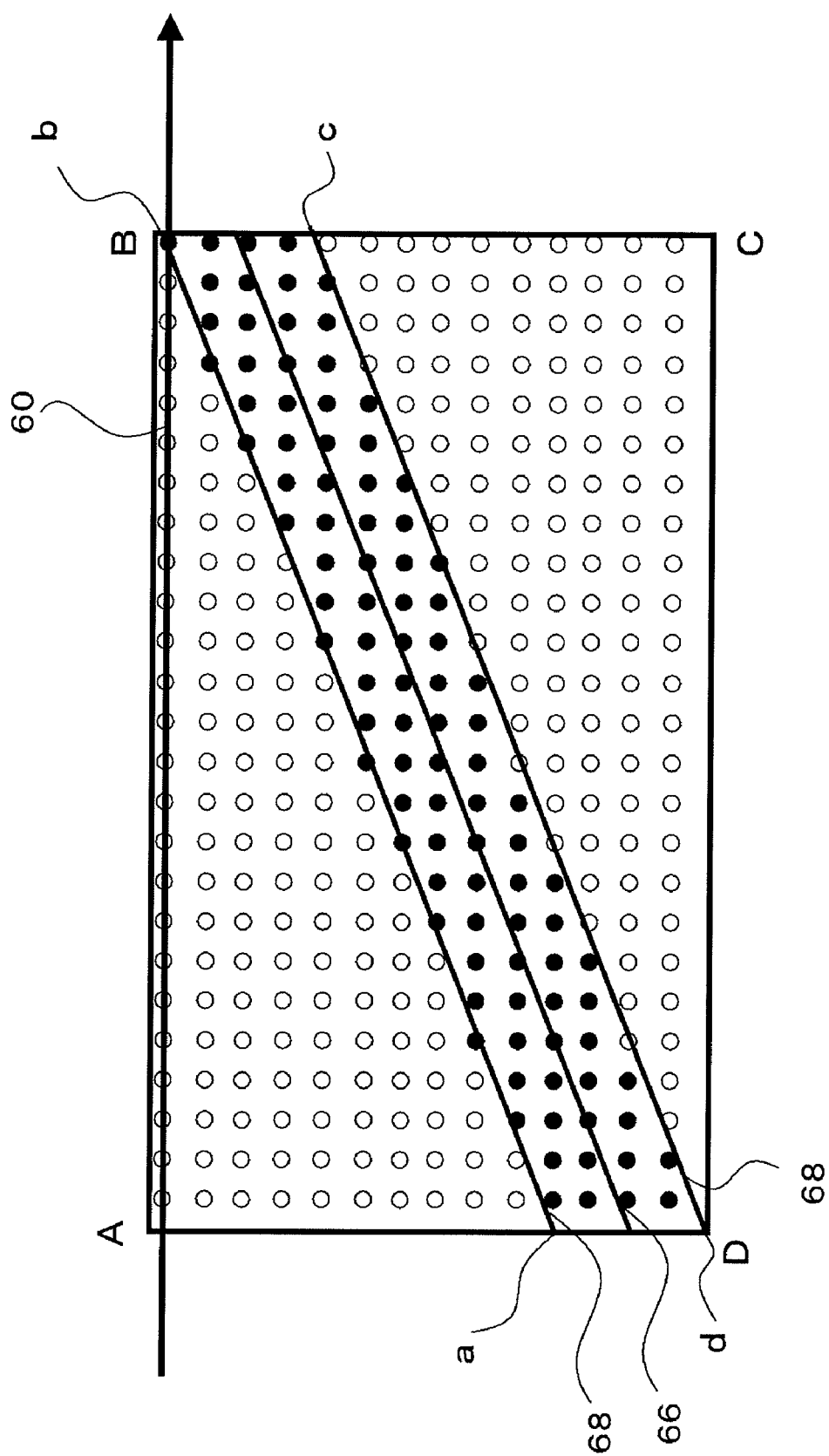
FIG. 10 is a diagram for describing a method of subpixel-based scanning in the present embodiment.

FIG. 10 illustrates a method of subpixel-based scanning in the present embodiment. First, as shown in S18 in FIG. 9, a scan area ABCD is determined so as to be a rectangle that circumscribes the parallelogram abcd and has sides parallel to the x-axis or y-axis of the rendering plane. In the present embodiment, the end sides ad and bc of the parallelogram abcd, each of which connects the two shift lines 68 at the ends, are parallel to the axis extending along the shifting direction of the rendering target line 66, i.e. minor axis or y-axis, and hence, some boundaries of the scan area ABCD, i.e. AD and BC, overlap with the end sides ad and bc, respectively. In the same manner, some boundaries of the scan area overlap with the end sides of the parallelogram also in a case where x-axis is the minor axis with respect to the rendering target line.

The scan area ABCD is then scanned sequentially row by row on a subpixel-by-subpixel basis in, for example, the scanning direction 60, in the same way as the inside/outside determination with respect to a triangle described above. Since boundaries of the scan area ABCD overlap with the end sides ad and bc, as stated previously, subpixels outside the end sides are not subject to scanning. Therefore, in scanning in this case, inside/outside determination is performed only according to whether or not subpixels are inside the two sides ab and dc.

With regard to subpixels positioned on the two sides ab and dc, a rule should be set to make the width of the rendering line closer to d, such as determining a subpixel on one side as being outside when a subpixel on the other side is determined as being inside. Similarly, also as to subpixels on the two sides ad and bc, a rule should be set such as determining a subpixel on one side as being outside when a subpixel on the other side is determined as being inside. Accordingly, a line having a length closer to the intrinsic length of the rendering target line can be rendered. Also, when multiple lines connect to each other, double counting of subpixels at the connections can be prevented.

There will now be described an operating principle for readily performing the scanning method for inside/outside determination of subpixels with respect to the parallelogram abcd in the present embodiment, by applying the inside/outside determination function used in the case of triangle.

Figure 11:
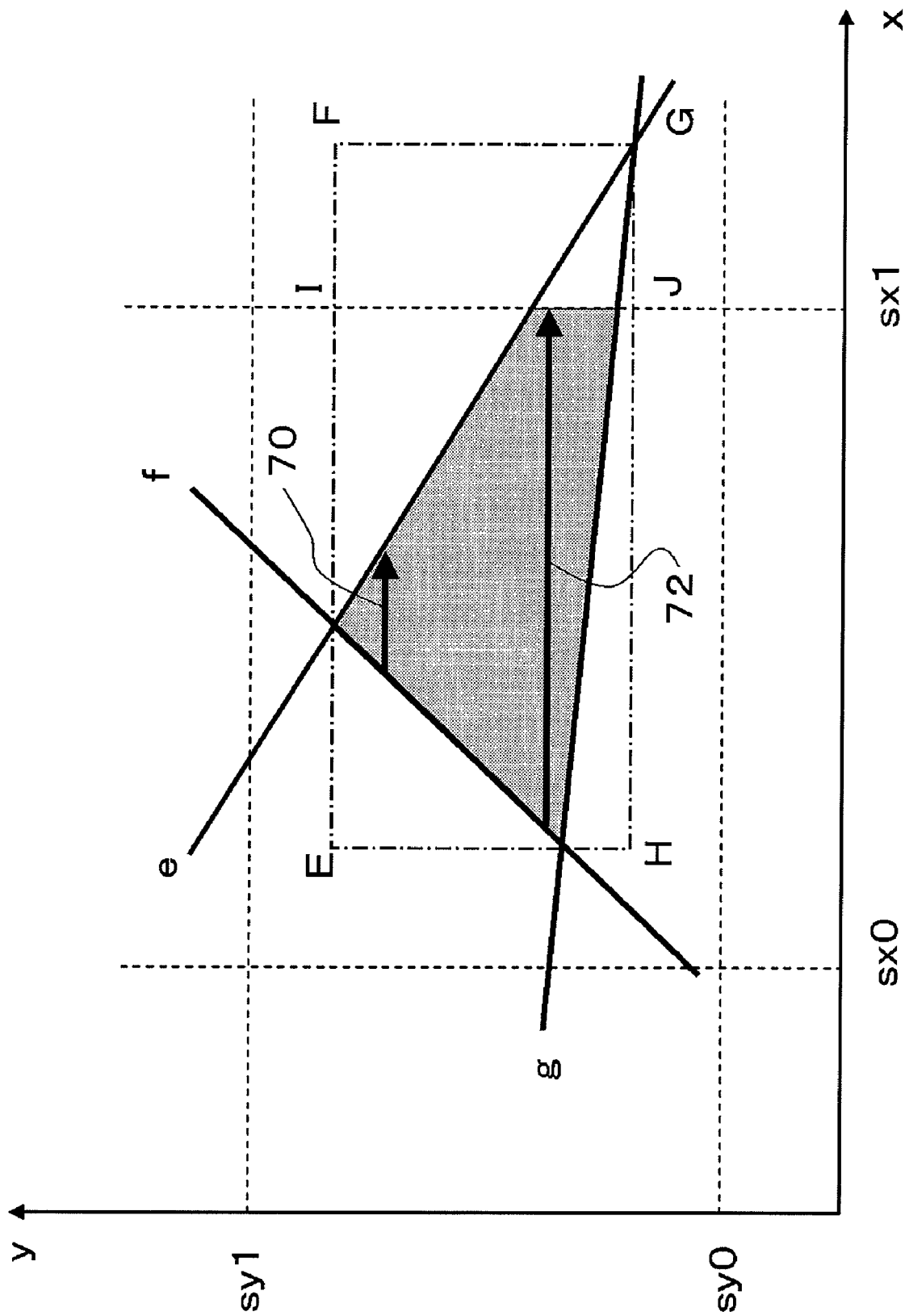
FIG. 11 is a diagram for describing a method for inside/outside determination of pixels or subpixels in rendering a triangle.

To understand the present embodiment, the inside/outside determination processing with respect to a triangle will be described first. FIG. 11 illustrates a method for inside/outside determination of pixels or subpixels for a case where a triangle is to be rendered. The lines representing the edge functions for the triangle are designated e, f and g in the figure, and coordinates on the rendering plane are provided as (x,y). In the following, the description will be made assuming for consistency with the present embodiment that the inside/outside determination is performed subpixel by subpixel.

First, a bounding box to be scanned, i.e. scan area, is specified. The rectangle that circumscribes the triangle formed by the lines e, f and g is a rectangle EFGH. If the triangle protrudes from the renderable area, such as image display area in a display apparatus, the part protruding will naturally not be scanned as the pixel information of such part is unnecessary for displaying. When the predetermined renderable area (hereinafter, referred to as "scissoring area") is given by $sx0 \leq x \leq sx1$ and $sy0 \leq y \leq sy1$ as shown in FIG. 11, the scan area for the triangle is a rectangle EIJH—the common area of the circumscribing rectangle EFGH and the scissoring area aforementioned.

After the scan area is specified, subpixel-based scanning is performed, for example starting from the intersection of the edge functions e and f, along scan lines parallel to the x-axis sequentially toward the negative direction of the y-axis. For example, subpixels are scanned from the line f in the positive direction of the x-axis, as shown by a scan line 70, and the scanned subpixels are determined as being inside the triangle. When the scanning reaches the line e, subpixels in the next row below are scanned in the same manner. As this operation is repeated, there will be eventually a row in which scanning reaches the side IJ of the scan area EIJH, i.e. a boundary of the scissoring area, before reaching the line e. In such case, scanning proceeds to the next scan line upon reaching the side IJ, as shown by a scan line 72.

In the inside/outside determination of subpixels with respect to the triangle as described above, the scan area is determined based upon the values sx0, sx1, sy0 and sy1 specifying the predetermined scissoring area, and upon the edge functions for the lines e, f and g forming the sides of the triangle. There will be described next a case where, by using such inside/outside determination function in the case of triangle, subpixels included in the parallelogram abcd of the present embodiment are detected.

Figure 12:
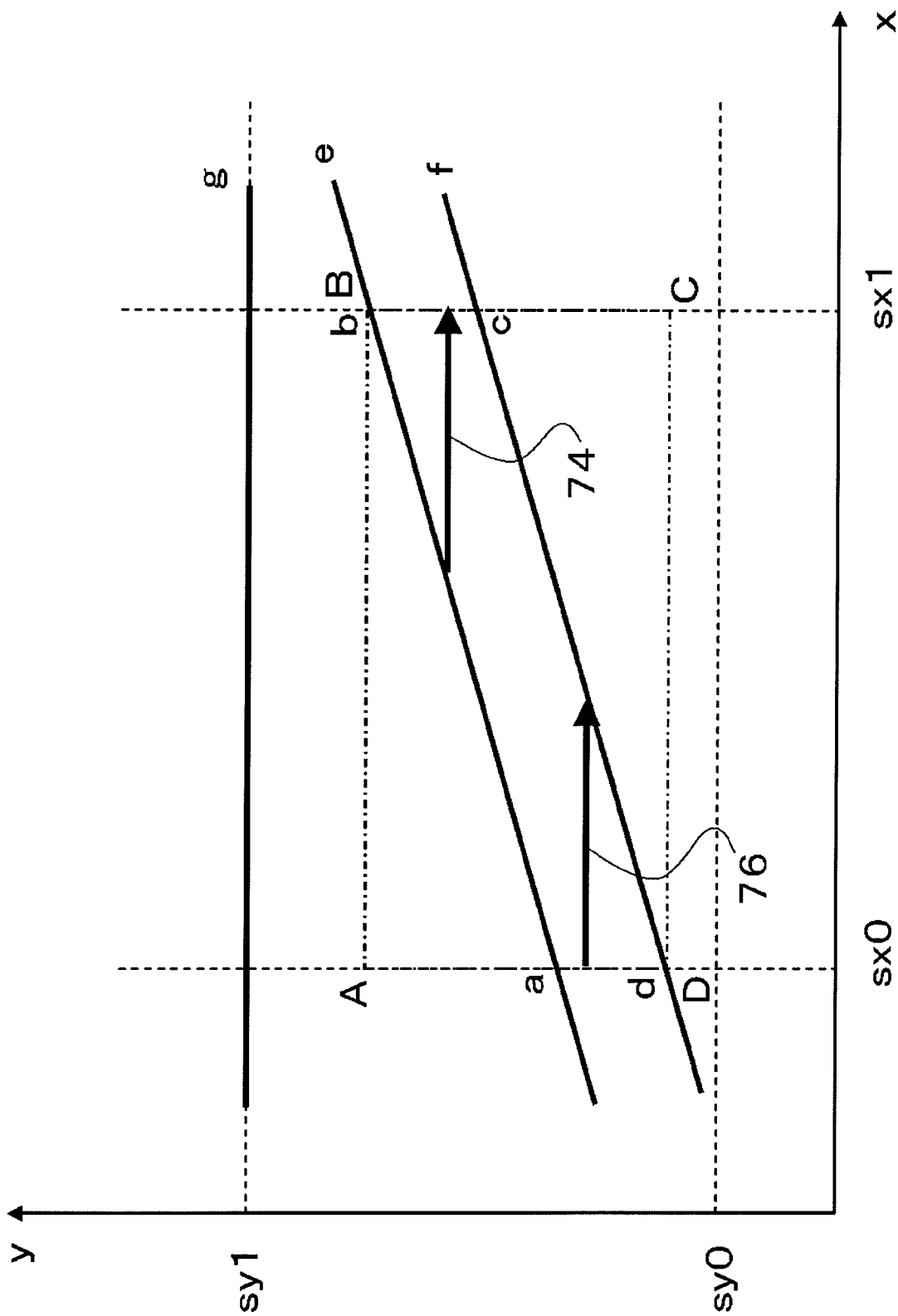
FIG. 12 is a diagram for describing a method for inside/outside determination of subpixels in the present embodiment, which applies the method used in rendering a triangle.

FIG. 12 illustrates a method for inside/outside determination of subpixels in the present embodiment, which applies the method used in rendering a triangle. First, the edge functions corresponding to the two shift lines 68, which form the two sides ab and dc of the parallelogram abcd, are provided as the functions for the two lines e and f of the three lines forming the sides of the triangle in FIG. 11. For the remaining line g is provided, for example, a function corresponding to one of the boundaries of the scissoring area; a function $y=sy1$ is provided for g in FIG. 12. Meanwhile, the function defining the end side ad or bc gives a constant with respect to x. Such constants are then set as sx0 and sx1 from $x=sx0$ and $x=sx1$, which represent the boundaries of the scissoring area parallel to the minor axis, i.e. y-axis.

Consequently, the scan area is automatically determined as the rectangle ABCD. Therefore, in subpixel-based scanning with respect to the parallelogram abcd, a scan line 74 having the starting point on the side ab has the ending point on the end side bc, while a scan line 76 having the ending point on the side dc has the starting point on the end side ad. Thus, when scanning rows of subpixels traversing the end sides, the outside of the end sides is set not to be scanned, and the detection of subpixels in the parallelogram abcd will be completed by performing the same processing as used in the case of triangle only with respect to the two lines e and f. The embodiment above describes with reference to FIG. 12 a case where the y-axis is the minor axis, but the method will be the same in a case where the x-axis is the minor axis. Specifically, the line g may be defined, for example, as $x=sx1$, and the constants with respect to y represented by the end sides may be set as sy0 and sy1 from $y=sy0$ and $y=sy1$, which are functions representing some of the boundaries of the scissoring area.

With regard to subpixels positioned on the end sides ad and bc, a rule is set as previously discussed, such as determining a subpixel on one end side bc as being outside the parallelogram when a subpixel on the other end side, ad, is determined as being inside. Thus, double counting of subpixels at the connections of multiple lines can be prevented. Also, when multiple lines, among which the minor axis is common, connect to each other in the present embodiment, since the function representing an end side for a line is identical with that representing an end side for another line, in which such function gives a constant with respect to x or y, the irregularities caused by the ends of each line at the connections do not appear.

In FIG. 12, the constants with respect to x given by the functions defining the end sides ad and bc are set as sx0 and sx1 from $x=sx0$ and $x=sx1$, which represent two boundaries of the scissoring area. When a boundary of the predetermined scissoring area lies inside at least either of the end sides of the parallelogram abcd, however, the part of the parallelogram abcd protruding from the scissoring area needs not be scanned. In such case, the parallelogram abcd is parted by such boundary, as described in the case of triangle shown in FIG. 11, and the area enclosed by such boundary and some boundaries of the scan area ABCD in FIG. 12 will be the practical scan area. This is a case where an end side is merely translated inside the parallelogram abcd, and the same function and effect of the present embodiment can be acquired therein.

Thus, the present embodiment described above enables rendering of lines with less effect of aliasing and no loss of width or shade thereof, by computing an area on the basis of the desired width of the line before performing subpixel-based inside/outside determination. Also, since such area is defined by functions acquired merely by translating in the axial direction the rendering target line for which the edge function has been obtained, a divider or other components need not be newly implemented. In addition, since the end sides are parallel to an axis of the rendering plane, functions typically implemented in hardware for rendering a triangle or the like can be used, as they are, to determine the scan area. Consequently, such rendering can be performed with inexpensive implementation cost and no increase in computational load. Also, when the rendering line contains a configuration in which multiple lines, among which the minor axis is common, connect to each other, the end sides for such lines are parallel to each other, and hence, the end sides overlap at the connections. Therefore, the line can be rendered with excellent continuity.

The present invention has been described with reference to the embodiment. The embodiment above is intended to be illustrative only and it will be obvious to those skilled in the art that various modifications to constituting elements or processes could be developed and that such modifications are also within the scope of the present invention.

Although the present embodiment mainly describes a configuration for 3D graphics processing, the operation of the rasterizer 10 is also the same in 2D graphics processing. Also, the rendering target line is not limited to a straight line, so that the same processing is also applicable to a curved line. In addition, an area created by shifting the rendering target line, such as a parallelogram, may not necessarily have the same width as the display area of one pixel, but may have a width appropriately set in accordance with a user input or the like. Also in these variations, an area having desired geometry and width is created before subpixel-based inside/outside determination is performed with respect to such area using the inside/outside determination function for the case of triangle, so that pixel-based information can be acquired based on the result. Consequently, line rendering can be performed with minimal effect on the geometry or shade and less aliasing effect, without increasing the implementation cost or processing load.

INDUSTRIAL APPLICABILITY

As is discussed above, the present invention is available for electronic devices such as computers, gaming devices and televisions that display high-definition images.

The invention claimed is:

1. A method for rendering lines on a display screen, comprising:
acquiring vertex data of a line to be rendered;
specifying an area for rendering the line to be rendered in such a manner as to contain the line to be rendered in the center and have a width which is an integral multiple of the size of a pixel in either the horizontal or vertical direction of a display screen, the area defining two sides extending in only one of the horizontal or vertical directions and the selection of the horizontal or vertical direction being determined by the angle of the line;
determining regions inside and outside of the area for rendering the line by specifying and scanning a scan area of pixels which contains the area for rendering the line, each pixel having a display area;
determining a pixel value for each pixel in the scan area in accordance with the proportion of the display area of each pixel included in the area for rendering the line; and
rendering the line on the display screen according to the pixel values thus determined.

2. A method for rendering lines on a display screen, comprising:
shifting a line to be rendered by a predetermined width in either a horizontal or vertical direction of a display screen to define two parallel lines, the horizontal or vertical shift direction being determined according to the angle of the line to be rendered;
specifying an area for rendering the line in such a manner as to contain the line to be rendered, to include the two shifted parallel lines as boundaries, and to include the endpoints of the two shifted parallel lines as vertices of the area, the area defining two sides extending in only one of the horizontal or vertical directions;
determining regions inside and outside of the area for rendering the line by specifying and scanning a scan area of pixels which contains the area for rendering the line, each pixel having a display area;
determining a pixel value for each pixel in the scan area in accordance with the proportion of the display area of each pixel included in the area for rendering the line; and
rendering the line on the display screen according to the pixel values thus determined.

3. The rendering method of claim 2, wherein the two sides define boundaries of the area for rendering the line, one side connecting the starting points of the two shifted parallel lines and the other side connecting the ending points of the two shifted parallel lines.

4. The rendering method of claim 2, wherein the proportion of the display area of each pixel included in the area for rendering the line is determined in accordance with the number of subpixels included in the area for rendering the line, the subpixels obtained by virtually dividing the display area of each pixel into a predetermined number.

5. A method for rendering lines on a display screen, comprising:
shifting a line to be rendered by a predetermined width in either a horizontal or vertical direction of a display screen to define two parallel lines, the horizontal or vertical shift direction being determined according to the angle of the line to be rendered;
specifying an area for rendering the line, which contains the line to be rendered, to include the two shifted parallel lines as boundaries and to include the endpoints of the two shifted parallel lines as vertices of the area, the area defining two sides extending in only one of the horizontal or vertical directions;
specifying a scan area of pixels, the scan area defining a rectangular shape, containing the area for rendering the line, and including the two sides of the area for rendering the line in the boundaries thereof;
scanning the scan area on a subpixel-by-subpixel basis, in which the subpixels are obtained by virtually dividing a display area of a pixel into a predetermined number, and acquiring the number of subpixels included in the area for rendering the line;
determining the pixel value of each pixel in accordance with the proportion of the number of subpixels included in the area for rendering the line among subpixels included in each pixel; and
rendering the line on the display screen according to the pixel values thus determined.

6. A method, method for rendering lines on a display screen, comprising:
acquiring vertex data of a straight line to be rendered;
specifying a scan area of pixels in such a manner as to contain a parallelogram which contains the straight line and which has a predetermined width in either the horizontal or vertical direction of a display screen, the horizontal or vertical direction being determined according to the angle of the line;
performing an inside/outside determination of the parallelogram by scanning the scan area on the basis of a minute area smaller than a display area of a pixel, so as to evaluate the degree of the display area of each pixel inside the parallelogram; and
determining a pixel value of each pixel based upon the degree; and
rendering the line on the display screen according to the pixel values thus determined.

7. An image generating apparatus comprising:
a rendering information acquisition unit which reads information on an image to be rendered;
a rendering data generating unit which generates rendering data represented on a pixel-by-pixel basis by each pixel value based upon the information on the image; and
a rendering data storage unit which stores the rendering data, wherein,
in representing, on a pixel-by-pixel basis, a line to be rendered included in the information on the image, the rendering data generating unit specifies an area for rendering the line in such a manner as to contain the line to be rendered in the center and to have a width which is an integral multiple of the size of a pixel in either the horizontal or vertical direction of a display screen, the horizontal or vertical direction being determined according to the angle of the line, and wherein
the unit specifies a scan area of pixels which contains the area for rendering the line, each pixel having a display area; scans the scan area to define inside and outside regions of the area for rendering the line; and determines a pixel value for each pixel in the scan area in accordance with the proportion of the display area of each pixel included in the area for rendering the line.

8. An image generating apparatus comprising:
a rendering information acquisition unit which reads information on an image to be rendered;
a rendering data generating unit which generates rendering data represented on a pixel-by-pixel basis by each pixel value based upon the information on the image; and
a rendering data storage unit which stores the rendering data, wherein,
in representing, on a pixel-by-pixel basis, a line to be rendered included in the information on the image, the rendering data generating unit specifies an area for rendering the line in such a manner as to contain the line to be rendered, to include two parallel lines as boundaries obtained by shifting the line to be rendered by a predetermined width in either the horizontal or vertical direction of a display screen, the horizontal or vertical shift direction being determined by the angle of the line, and to include the endpoints of the two shifted parallel lines as vertices of the area, the area defining two sides extending in only one of the horizontal or vertical directions; and wherein
the unit specifies a scan area of pixels which contains the area for rendering the line, each pixel having a display area; scans the scan area to define inside and outside regions of the area for rendering the line; and determines a pixel value for each pixel in the scan area in accordance with the proportion of the display area of each pixel included in the area for rendering the line.

9. The image generating apparatus of claim 8, wherein the two sides define boundaries of the area for rendering the line, one side connecting the starting points of the two shifted parallel lines and the other side connecting the ending points of the two shifted parallel lines.

10. The image generating apparatus of claim 8, wherein the proportion of the display area of each pixel included in the area for rendering the line, acquired by the rendering data generating unit, is determined in accordance with the number of subpixels included in the area for rendering the line, the subpixels obtained by virtually dividing the display area of each pixel into a predetermined number.

11. The image generating apparatus of claim 10, wherein, in order to detect the subpixels included in the area for rendering the line, the rendering data generating unit specifies a scan area of rectangular shape including the area for rendering the line and scans the scan area on the subpixel-by-subpixel basis in either the horizontal or vertical direction of a display screen.

12. The image generating apparatus of claim 11, wherein the rendering data generating unit specifies the scan area in a manner such that a part of the boundaries thereof overlaps with the two sides of the area for rendering the line.

13. The image generating apparatus of claim 8, wherein the rendering data generating unit performs the shifting in the vertical direction when the acute angle formed by the line to be rendered and the horizontal direction of a display screen is a predetermined angle or less, and performs the shifting in the horizontal direction when such acute angle is more than the predetermined angle.

14. The image generating apparatus of claim 10, wherein, in acquiring the number of subpixels included in the area for rendering the line, a subpixel on one boundary of a pair of boundaries, facing each other, of the area for rendering the line is determined as being inside the area for rendering the line, while a subpixel on the other boundary thereof is determined as being outside the area for rendering the line.

15. An electronic information device comprising the image generating apparatus of claim 7 and a control unit which controls the image generating apparatus, wherein an image generated by the image generating apparatus is displayed on a display apparatus under the control of the control unit.

16. An electronic information device comprising the image generating apparatus of claim 8 and a control unit which controls the image generating apparatus, wherein an image generated by the image generating apparatus is displayed on a display apparatus under the control of the control unit.

* * * * *